Patented Aug. 21, 1934

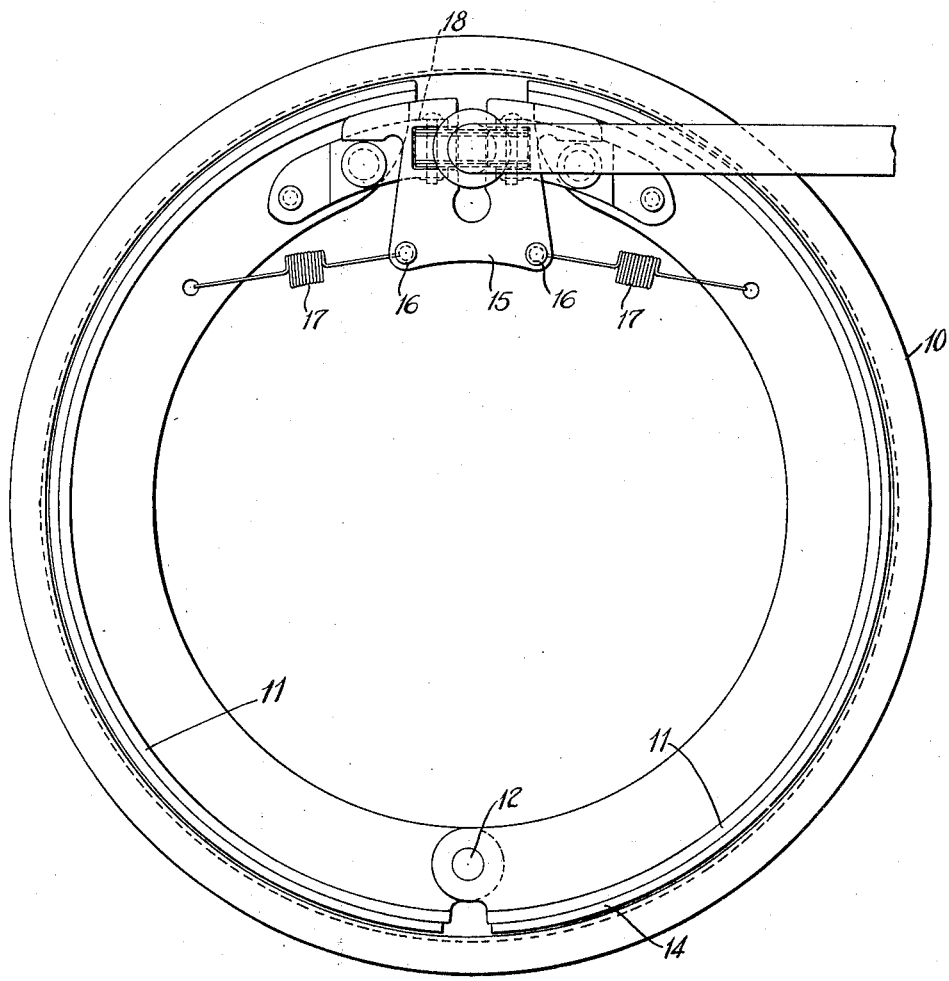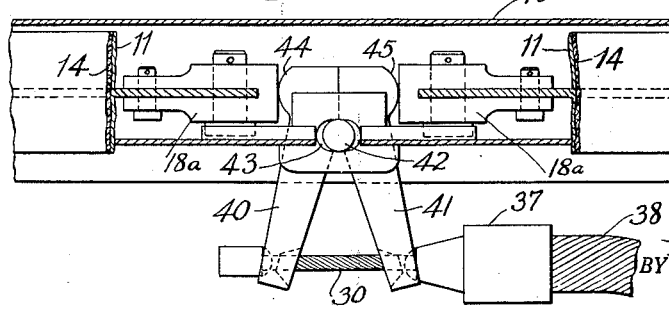

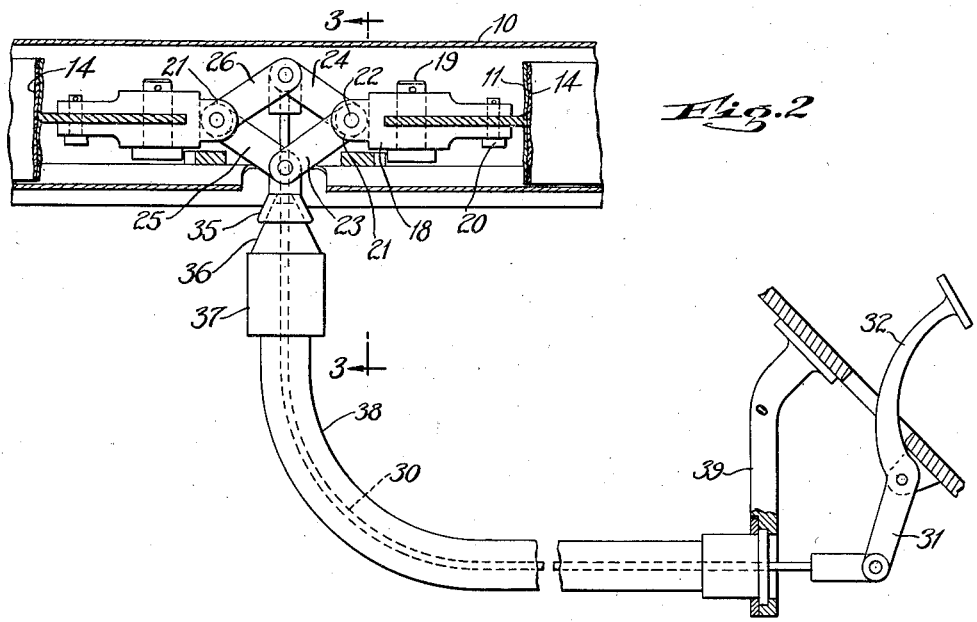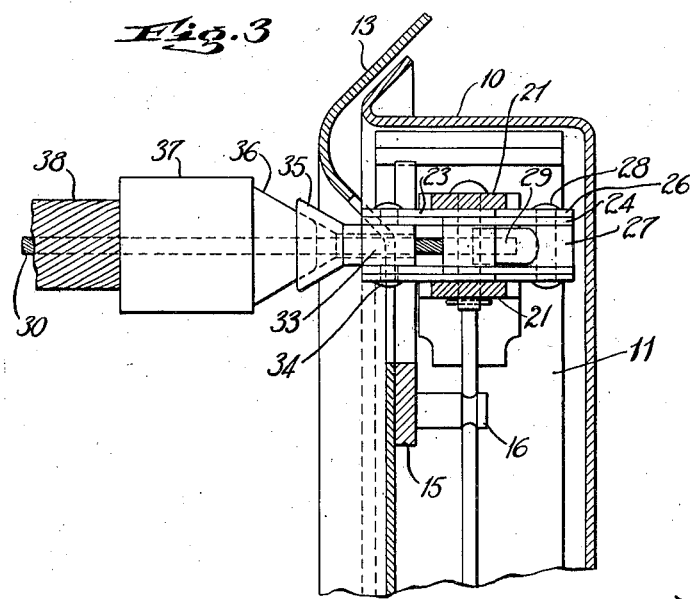

1,970,680

UNITED STATES PATENT OFFICE 1,970,680

BRAKE OPERATING MECHANISM

Harry Williams, Detroit, and Gorman C. Burd, Adrian, Mich., assignors to American Cable Company, Inc., a corporation of Delaware Application December 4, 1930, Serial No. 499,868

1 Claim. (Cl. 188—78)

The present invention relates to brakes and has for an object to provide a novel method of and means for operating the same.

The invention is particularly adapted for use on the dirigible wheels of vehicles to provide a convenient connection between the brakes and a controller, such, for instance, as a pedal or hand lever.

Obviously the connection between a pedal and a dirigible wheel must be flexible to allow for steering movements of the wheel. To this end, it has been a practice heretofore to use a cable or a flexible tension member to connect the brake and the pedal, and in order to prevent variation in the effective length of the cable as the wheel is steered the cable is passed through a flexible casing secured at one end to the brake housing and at the other to a fixed support. The casing is of such construction that it will flex as the wheel is turned about the steering knuckle, but the distance from end to end of the casing along the axis of the bore will remain substantially constant. By this arrangement, the wheel may be steered without introducing slack in the operating cable or subjecting the cable to tension by reason of steering movements of the wheel.

On pulling a cable through a casing of the type described above, if the axis of the casing coincides with the line of pull, there will be no thrust on the casing except that due to frictional engagement thereof with the cable. If, on the other hand, the casing is bent, a pull on the cable will impart a thrust to the casing tending to straighten it out and the force developed at each end of the casing will be substantially equal to that applied to the cable.

It is an object of the present invention to utilize the thrust of the casing as well as the pull of the cable to operate the brake.

An advantage of this arrangement is that the forces developed are better balanced and lateral or transverse thrusts on the brake parts are avoided.

Other objects and advantages of the invention will appear in the following description of a preferred embodiment and also of a modification thereof and thereafter the novelty and scope of the invention will be pointed out in the claim.

In the accompanying drawings;

Figure 1 is a view in side elevation of a brake provided with the improved operating mechanism;

Fig. 2 is a fragmental plan view of the same showing the connection to a brake pedal;

Fig. 3 is a view in section on an enlarged scale taken on the line 3—3 of Fig. 2; and Fig. 4 is a fragmental plan view of a modified form of brake operating mechanism.

In the drawings the invention is shown as applied to a brake of the type comprising a pair of hinged shoes which may be expanded against the inner periphery of a brake drum to arrest rotation of the drum.

The brake drum is indicated by the reference numeral 10. The brake shoes 11 are hinged upon a pivot pin 12 carried by a housing 13 of the brake. The shoes are preferably of T-shape in cross section, the head of the T bearing the usual lining material 14 and the web of the T serving to reinforce the shoe. It will be understood, of course, that in the case of a dirigible wheel the housing 13 is mounted to turn with the wheel about the steering knuckle. On the side opposite the pivot pin 12, a plate 15 is mounted on the housing and carries a pair of pins 16. These pins serve as anchorages for a pair of springs 17 which are connected at their opposite ends to the brake shoes 11. The springs thus normally tend to draw the brake shoes toward each other and away from the brake drum.

To the free end of each brake shoe is secured a connecting member 18 formed with eye lugs 21 disposed in vertical alinement to receive a pintle 22 upon which two pairs of toggle links are pivotally mounted. Thus, pivotally connected to one of the connection members are upper and lower toggle links 23 and upper and lower toggle links 24. Similarly, upper and lower toggle links 25 and upper and lower toggle links 26 are pivotally connected to the other connecting member. The links 23 and 25 are pivotally connected together and the links 24 are pivotally connected to the links 26. Thus, the system of links takes the form of quadrilateral figure, as clearly shown in Fig. 2.

The upper links are spaced from the lower ones, as shown in Fig. 3. A spacer collar 27 is fitted between the upper links 24 and 26 and the lower links 24 and 26 and a pintle 28 passing through this collar serves to connect the links together in pivotal relation. The collar 27 is provided with a lateral socket 29 in which one end of a cable 30 is anchored. This cable at its opposite end is connected to an arm 31 of a pedal 32.

There is also a spacer member 33 fitted between the upper and lower links 23 and 25 and this spacer member is formed with studs 34 which serve as pivots for said links. The member 33 is transversely bored so that the cable 30 may pass therethrough and at its outer end is formed with a socket member 35 providing a conical seat for a conical nose formed on a fitting 37. The fitting is applied to one end of a flexible casing 38, the other end of the casing being anchored to a suitable support 39. The casing is of a type which will maintain a uniform length as measured along the axis thereof from one end to the other no matter in what direction or how the casing is bent. As shown in Fig. 2, the casing 38 through which the cable 30 passes is bent and hence in operation when a pull is applied to the pedal 32 pressure is exerted upon the cable 30 tending to strengthen the casing. The compressive force applied to the casing is substantially equal to the tensile force applied to the cable. Consequently, there will be pull on the links 24 and 26 and a thrust on the links 23 and 25 of substantially the same amount tending to force the shoes apart against the pull of the springs 17. Due to the toggle link connection, a very powerful thrust will be imparted to the brake shoes producing a very powerful braking action.

If the casing were anchored at both ends the pedal 32 would need to move only half as far to cause a given movement of the brakes provided the casing were incompressible and the cable nonextensible. The reason for this will be obvious. When the links 24 and 26 are drawn through a certain distance, the opposite end of the cable will be moved through a like distance, but, if at the same time the casing is permitted to move upward, as shown in Fig. 2, against the links 23 and 25, double the length of cable will be drawn out of the anchored end of the casing and the pedal 32 will have to move twice as far as in the previous case. Theoretically, then there would be no power gain in utilizing the thrust of the casing as well as the pull of the cable, but in actual practice there are material advantages. If the thrust of the casing were not used the pull on the links 24 and 26 would result in a lateral thrust of the brake shoes against the housing 13 which would develop considerable friction. When the thrust of the casing is applied to the links 23 and 25 a balanced condition is obtained which eliminates lateral friction, thus materially reducing the tension requisite in the cable. Furthermore, since for a given brake movement the cable movement is greater when the thrust of the casing is utilized the cable is subjected to still less tensile strain. Consequently, there is less stretch of the cable and less compression of the casing and because of the reduced tension in the cable less friction is developed between the cable and the casing. As a result the power applied at the pedal is much more efficiently used when the thrust of the casing as well as the pull of the cable is employed, because less energy is wasted in friction and deformation of the casing and cable.

It will be observed that by our arrangement operation of the shoes is effected through a floating system of toggle links so that the pressure of the two shoes will be equalized. This is of importance in case there should be more wear on one shoe than on another.

In the modification shown in Fig. 4 parts that are like those shown in Figs. 1–3 are marked with the same reference numerals. A pair of levers 40 and 41 are used in place of the toggle links. Each lever is formed with a half round recess to bear against a fulcrum 42. The latter consists of a pin having a certain amount of freedom in a slotted bearing 43 carried by the housing 13 whereby the fulcrum is permitted to move parallel to the plane of the brake shoes. The levers are formed with half round bearing surfaces 44 and 45 which bear against thrust members 18a secured respectively to the brake shoes 11. By drawing the outer ends of the levers together the brake shoes will be pressed outward into engagement with the brake drum.

One end of the cable 30 is connected to the lever 40 and the adjacent end of the casing 38 bears against the other lever 41. The casing and cable in this instance project parallel to the plane of the wheel and not at right angles thereto, as in the construction shown in Figs. 1 to 3. The casing is bent, however, so that when a pull is exerted on the cable, a thrust will be developed in the casing. By reason of the floating support of the fulcrum pin 42 the brake shoes can adjust themselves so that the pressure they exert upon the brake drum will be equalized.

It will be observed that a new method of operating brakes is disclosed in the present invention and while the particular constructions described above represent two embodiments of the invention, obviously, the same principle of operation can be applied in a number of different ways and the particular embodiments can be changed in form, construction and arrangement of parts without departing from the spirit and scope of the invention.

We claim:

In a brake mechanism including a pair of brake shoes, a plurality of toggle links pivotally connected in the form of a quadrilateral figure, said links being pivotally connected at opposite corners of the quadrilateral figures to the brake shoes respectively, whereby on drawing the intermediate corners of the figure toward each other the shoes will be spread into operating engagement with the brake drum, a resiliently flexible tubular thrust member connected at one end to the links at one of said intermediate corners, a fixed support to which the other end of the thrust member is secured, a tension member threaded through and slidable in the thrust member and connected at one end to the links at the other of the intermediate corners, and means for applying tension to the tension member at the other end thereof.

HARRY WILLIAMS.
GORMAN C. BURD.